(12) United States Patent
Kameshima et al.

(10) Patent No.: US 8,576,294 B2
(45) Date of Patent: Nov. 5, 2013

(54) READOUT APPARATUS AND IMAGING APPARATUS

(75) Inventors: Toshio Kameshima, Kumagaya (JP); Tadao Endo, Honjo (JP); Tomoyuki Yagi, Chofu (JP); Katsuro Takenaka, Kodama-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 812 days.

(21) Appl. No.: 12/271,612

(22) Filed: Nov. 14, 2008

(65) Prior Publication Data

US 2009/0065702 A1    Mar. 12, 2009

Related U.S. Application Data

(62) Division of application No. 11/076,984, filed on Mar. 11, 2005, now Pat. No. 7,466,345.

(30) Foreign Application Priority Data

Mar. 12, 2004 (JP) .................................. 2004/071324

(51) Int. Cl.
*H04N 5/225* (2006.01)
*H04N 5/335* (2011.01)

(52) U.S. Cl.
USPC ................ 348/220.1; 348/300; 348/302

(58) Field of Classification Search
USPC ........... 348/220.1–222.1, 241–244, 294–323, 348/255, 289, 22.1, 77, 162, 308, 303, 304, 348/300, 301, 320, 321, 317, 302
See application file for complete search history.

(56) References Cited

U.S. PATENT DOCUMENTS

| | | | |
|---|---|---|---|
| 4,558,213 A | 12/1985 | Aizawa | 250/214 R |
| 4,899,212 A | 2/1990 | Kaneko et al. | 248/220.1 |
| 5,448,056 A | 9/1995 | Tsuruta | 250/214 A |
| 6,075,256 A | 6/2000 | Kaifu et al. | 257/53 |
| 6,185,274 B1 | 2/2001 | Kinno et al. | 378/98.8 |
| 6,538,591 B2 * | 3/2003 | Sato et al. | 341/155 |
| 6,798,453 B1 | 9/2004 | Kaifu | 348/304 |
| 6,816,195 B2 * | 11/2004 | Kimura et al. | 348/241 |
| 6,952,015 B2 | 10/2005 | Kameshima | 250/370.11 |
| 6,952,464 B2 | 10/2005 | Endo | 378/98.11 |
| 6,985,555 B2 | 1/2006 | Endo | 378/98.11 |
| 7,466,345 B2 * | 12/2008 | Kameshima et al. | 348/220.1 |

(Continued)

FOREIGN PATENT DOCUMENTS

| | | |
|---|---|---|
| JP | 06-235658 A | 8/1994 |
| JP | 08-116044 A | 5/1996 |

(Continued)

*Primary Examiner* — James M Hannett
*Assistant Examiner* — Ahmed A Berhan
(74) *Attorney, Agent, or Firm* — Fitzpatrick, Cella, Harper & Scinto

(57) ABSTRACT

An imaging apparatus includes a sensor array, readout apparatus, and control circuit. The readout apparatus includes first LPFs arranged in correspondence with signal lines, an analog multiplexer, and a second LPF. The cut-off frequencies of the first and second LPFs can be switched on two stages, and the control circuit switches the cut-off frequencies of the first and second LPFs in accordance with the imaging mode.

14 Claims, 9 Drawing Sheets

(56) References Cited

U.S. PATENT DOCUMENTS

| | | | |
|---|---|---|---|
| 2001/0012070 A1* | 8/2001 | Enod et al. | 348/302 |
| 2004/0027472 A1* | 2/2004 | Endo et al. | 348/308 |
| 2005/0109927 A1 | 5/2005 | Takenaka et al. | 250/252.1 |
| 2005/0173645 A1 | 8/2005 | Endo | 250/370.11 |
| 2005/0199834 A1 | 9/2005 | Takenaka et al. | 250/580 |
| 2005/0218333 A1 | 10/2005 | Kameshima | 250/370.11 |
| 2005/0220269 A1 | 10/2005 | Endo et al. | 378/114 |
| 2005/0220270 A1 | 10/2005 | Kameshima et al. | 378/116 |
| 2005/0264665 A1 | 12/2005 | Endo et al. | 250/559.07 |
| 2006/0119719 A1 | 6/2006 | Kameshima | 250/370.09 |

FOREIGN PATENT DOCUMENTS

| | | |
|---|---|---|
| JP | 09-307698 A | 11/1997 |
| JP | 11-150255 A | 6/1999 |
| JP | 11-331703 A | 11/1999 |
| JP | 2002-199292 A | 7/2002 |

* cited by examiner

READOUT APPARATUS AND IMAGING APPARATUS

RELATED APPLICATIONS

This is a divisional of application Ser. No. 11/076,984, filed Mar. 11, 2005, claims benefit of that application under 35 U.S.C. §120, and claims benefit under 35 U.S.C. §119 of Japanese patent application no. 2004/071324, filed Mar. 12, 2004. The entire content of each of the two mentioned prior applications is incorporated herein by reference.

FIELD OF THE INVENTION

The present invention relates to a readout apparatus and imaging apparatus suitable for a radiographic apparatus having a moving-image imaging mode and still-image imaging mode.

BACKGROUND OF THE INVENTION

There have conventionally been known an imaging apparatus and radiographic apparatus using a sensor array which adopts, as a material, amorphous silicon or polysilicon formed into a film on a glass substrate and is constituted by two-dimensionally arraying photoelectric conversion devices and TFTs. These apparatuses generally transfer charges photoelectrically converted by the photoelectric conversion device to a readout apparatus and read them out by matrix driving using the TFT.

The circuit configuration of the conventional imaging apparatus will be described. FIG. 5 is a schematic circuit diagram showing the circuit configuration of the conventional imaging apparatus.

As shown in FIG. 5, the conventional imaging apparatus has a sensor array in which pixels made up of PIN photodiodes S11 to S33 and thin film transistors (TFTs) T11 to T33 of amorphous silicon are arrayed, and performs matrix driving. The common electrode sides of the PIN photodiodes of the pixels receive a bias voltage Vs from the power supply. The gate electrodes of the TFTs of the pixels are connected to common gate lines Vg1 to Vg3, and the common gate lines Vg1 to Vg3 are connected to a gate driver 2 having a shift register (not shown) and the like. The source electrodes of the TFTs are connected to common signal lines Sig1 to Sig3. Signals output to the common signal lines Sig1 to Sig3 are output as digital image data to a digital output bus via a readout apparatus 101 having preamplifiers 16, an analog multiplexer 11, an A/D converter 13, and the like. In general, the analog multiplexer 11 is constituted by a plurality of amplifiers, analog switches, shift registers (none are shown), and the like.

The sectional structure of the pixel of the sensor array will be explained. FIG. 6 is a sectional view showing the pixel of the sensor array.

In each pixel, a gate electrode layer (lower electrode) 202, an insulating layer (amorphous silicon nitride film) 203, an amorphous silicon semiconductor layer 204, n-type amorphous silicon layers 205, and source and drain electrode layers (upper electrodes) 206 are stacked on a glass substrate 201 to constitute a selector thin film transistor (TFT) 222. Also, an extending portion (lower electrode layer) of the source/drain electrode layer 206, a p-type amorphous silicon layer 207, an amorphous silicon semiconductor layer 208, an n-type amorphous silicon layer 209, and an upper electrode layer 210 are stacked on the glass substrate to constitute a photodiode 221. The glass substrate 201 also supports a wiring portion 223 constituted by stacking the insulating layer 203, amorphous silicon semiconductor layer 204, n-type amorphous silicon layer 205, and source/drain electrode layer 206. A protective layer 211 is formed from an amorphous silicon nitride film or the like to cover these layers, and a phosphor layer 213 is adhered onto the protective layer 211 by using an adhesive layer 212.

The phosphor layer 213 is arranged to convert radiation (X-rays) into visible light. A photodiode formed using amorphous silicon generally exhibits low sensitivity to X-rays. The phosphor layer 213 is formed from a gadolinium-based material, CsI (cesium iodide), or the like.

In the conventional photoelectric conversion apparatus (radiographic apparatus), when X-rays having passed through an object are incident on the phosphor layer, they are converted into visible light, and visible light is incident on the photodiode. In the photodiode, charges are generated in the semiconductor layer, when the TFT is turned on, sequentially transferred to the readout circuit, and read out.

The operation of the conventional imaging apparatus will be described. FIG. 7 is a timing chart showing the operation of the conventional imaging apparatus.

First, the preamplifiers 16 and common signal lines are reset by a reset signal RC from a timing generator (not shown). Then, a pulse is applied to the common gate line Vg1, and the TFTs T11 to T13 connected to the common gate line Vg1 are turned on. Signal charges generated in the photodiodes S11 to S13 are transferred to the readout apparatus 101 via the common signal lines Sig1 to Sig3. The transferred charges are converted into a voltage by the preamplifier 16. A sample-and-hold signal SH is applied from the timing generator (not shown) to the readout apparatus 101, and the voltage output from the preamplifier 16 is sampled in a sample-and-hold capacitance.

The voltage sampled in the sample-and-hold capacitance is serially converted by the analog multiplexer 11, and output to an analog data line. The serial analog signal output to the analog data line is input to the A/D converter 13, A/D-converted by the A/D converter 13 in synchronism with a clock signal AD_CLK, and output to a digital output bus corresponding to the resolution of the A/D converter 13. When the conventional imaging apparatus is applied to a medical radiographic apparatus, the resolution of the A/D converter is generally 14 bits or more.

This operation is repeated for the gate lines Vg2 and Vg3, completing readout from a whole sensor array 4. Note that incident light (or X-rays) may be continuous light (or continuous X-rays) or pulsed light (or pulsed X-rays).

The conventional imaging apparatus which reads out signals by matrix driving from the area sensor array prepared by arraying photodiodes and TFTs has simply been described.

Other prior arts regarding the area sensor array structure and matrix driving are disclosed in Japanese Patent Laid-Open Nos. 8-116044 (refer to corresponding U.S. Pat. No. 6,075,256 B1) and 11-331703 (refer to corresponding U.S. Pat. No. 6,185,274 B1) and the like. The detailed configuration and operation of the readout apparatus are disclosed in Japanese Patent Laid-Open Nos. 2002-199292 (refer to corresponding U.S. Pat. No. 6,538,591 B1) and 6-235658 (refer to corresponding U.S. Pat. No. 5,448,056 B1) and the like. The imaging apparatus which matrix-drives the area sensor array and reads out data as a digital output by the readout apparatus including the A/D converter is disclosed in Japanese Patent Laid-Open Nos. 9-307698 (refer to corresponding U.S. Patent Application Publication No. 2001/0012070 A1) and 11-150255 (refer to corresponding U.S. Pat. No. 6,798,453 B1) and the like.

In the conventional imaging apparatus, however, thermal noise of the preamplifier 16 arranged in correspondence with each signal line and the like may increase to non-negligible level and influence the noise characteristic. Similarly, thermal noise of the amplifier arranged at the output of the analog multiplexer 11 and the like may increase to non-negligible level and influence the noise characteristic of the imaging apparatus. This state is shown in FIG. 8. That is, in the conventional imaging apparatus, the S/N ratio of the whole imaging apparatus may decrease owing to thermal noise of the amplifier which constitutes the readout apparatus 101, that of the resistor used at each portion, and the like.

Regarding this phenomenon, Japanese Patent Laid-Open No. 9-307698 describes reduction of thermal noise, i.e., KTC noise caused by the ON resistance of a switch used for a preamplifier. Japanese Patent Laid-Open No. 9-307698 describes an LPF means arranged in correspondence with each signal line in order to reduce high-frequency noise generated by thermal noise of the preamplifier or the like. Japanese Patent Laid-Open No. 9-307698 also describes a function of changing the timing of KTC noise cancellation and the through rate of the amplifier in order to switch between moving images and still images.

However, it is difficult to satisfactorily reduce noise even by the method described in Japanese Patent Laid-Open No. 9-307698 or the like.

SUMMARY OF THE INVENTION

It is an object of the present invention to provide a readout apparatus and imaging apparatus capable of satisfactorily reducing noise and attaining both a preferable readout rate characteristic in the moving-image imaging mode and a preferable noise characteristic in the still-image imaging mode.

The present inventor made extensive studies to solve the above problems, and has found out the following aspects of the present invention.

According to the present invention, a readout apparatus which reads out output signals via a plurality of signal lines from an area sensor having pixels with photoelectric conversion devices comprises a plurality of first low-pass filters which are arranged in correspondence with the respective signal lines, a conversion unit for serially converting signals having passed through the first low-pass filters and outputting the signals to not less than one data line, and a second low-pass filter which is arranged in correspondence with each of the data line.

According to the present invention, an imaging apparatus comprises an area sensor having pixels with photoelectric conversion devices, a readout apparatus which reads out output signals via a plurality of signal lines arranged in the photoelectric conversion devices, and a control unit for controlling operations of the area sensor and the readout apparatus, wherein the readout apparatus comprises a plurality of first low-pass filters which are arranged in correspondence with the respective signal lines, a conversion unit for serially converting signals having passed through the first low-pass filters and outputting the signals to not less than one data line, and a second low-pass filter which is arranged in correspondence with each of the data line, cut-off frequencies of the first and second low-pass filters can be switched on at least two stages, and the control unit switches the cut-off frequency of at least one of the first and second low-pass filters in accordance with an imaging mode.

According to the present invention, a method of controlling an imaging apparatus having an area sensor including pixels with photoelectric conversion devices, and a readout apparatus which reads out output signals via a plurality of signal lines arranged in the photoelectric conversion devices, the readout apparatus having a plurality of first low-pass filters which are arranged in correspondence with the respective signal lines, a conversion unit for serially converting signals having passed through the first low-pass filters and outputting the signals to not less than one data line, and a second low-pass filter which is arranged in correspondence with each of the data line, cut-off frequencies of the first and second low-pass filters being switchable on at least two stages comprises switching the cut-off frequency of at least one of the first and second low-pass filters in accordance with an imaging mode.

According to the present invention, a program for causing a computer to control an imaging apparatus having an area sensor including pixels with photoelectric conversion devices, and a readout apparatus which reads out output signals via a plurality of signal lines arranged in the photoelectric conversion devices, the readout apparatus having a plurality of first low-pass filters which are arranged in correspondence with the respective signal lines, a conversion unit for serially converting signals having passed through the first low-pass filters and outputting the signals to not less than one data line, and a second low-pass filter which is arranged in correspondence with each of the data line, cut-off frequencies of the first and second low-pass filters being switchable on at least two stages causes the computer to perform a process of switching the cut-off frequency of at least one of the first and second low-pass filters in accordance with an imaging mode.

The present invention can reduce the influence of noise which may be generated by the conversion unit or the like within the readout apparatus, and can obtain a high S/N ratio.

When the cut-off frequencies of the first and second low-pass filters can be switched on at least two stages, for example, both a preferable readout rate characteristic in the moving-image imaging mode and a preferable noise characteristic in the still-image imaging mode can be attained, acquiring a high-quality image in the two operation modes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail below with reference to the accompanying drawings.

First Embodiment

Figure 1:
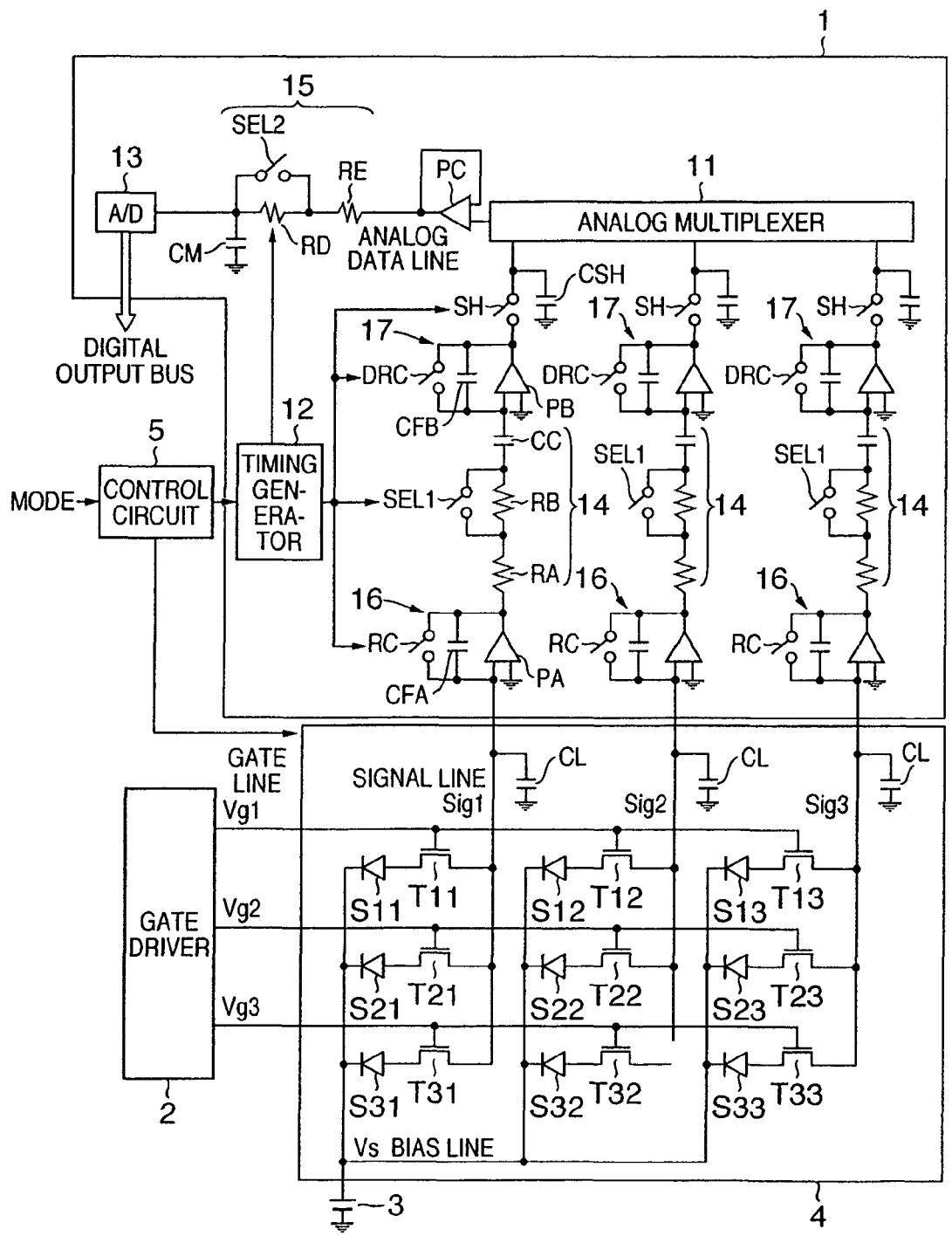
FIG. 1 is a schematic circuit diagram showing the circuit configuration of an imaging apparatus according to the first embodiment of the present invention.

The first embodiment of the present invention will be described. FIG. 1 is a schematic circuit diagram showing the circuit configuration of an imaging apparatus according to the first embodiment of the present invention.

As shown in FIG. 1, the imaging apparatus according to the first embodiment comprises a readout apparatus 1, gate driver 2, power supply 3, and sensor array (area sensor) 4. In the sensor array 4, pixels are arrayed which are made up of PIN photodiodes S11 to S33 and thin film transistors (TFTs) T11 to T33 having amorphous silicon layers. The sensor array 4 performs matrix driving using the gate driver 2. The common electrode sides of the PIN photodiodes S11 to S33 of the pixels receive a bias voltage Vs from the power supply 3. The gate electrodes of the TFTs T11 to T33 of the pixels are connected to common gate lines Vg1 to Vg3, and the common gate lines Vg1 to Vg3 are connected to the gate driver 2 having a shift register (not shown) and the like. The source electrodes of the TFTs T11 to T33 are connected to common signal lines Sig1 to Sig3. The common signal lines Sig1 to Sig3 are connected to the readout apparatus 1.

In the readout apparatus 1, the signal lines Sig1 to Sig3 of the sensor array 4 are connected to charge-to-voltage conversion amplifiers (preamplifiers) 16 each made up of an operational amplifier PA, feedback capacitance CFA, and reset switch RC.

The output side of each charge-to-voltage conversion amplifier 16 is connected to a first LPF (Low-Pass Filer) 14 made up of a resistor RA, resistor RB, capacitance CC, and switch SEL1. The first LPF 14 can switch the cut-off frequency by using the switch SEL1. That is, the cut-off frequency of the first LPF 14 can be selected from the following two frequencies fc1 and fc2:

$$fc1 = 1/(2 \cdot \Pi \cdot (RA+RB) \cdot CC)$$

$$fc2 = 1/(2 \cdot \Pi \cdot RA \cdot CC) > fc1$$

The output side of each first LPF 14 is connected to an amplifier 17 made up of an operational amplifier PB, feedback capacitance CFB, and reset switch DRC. The reset switches DRC are turned on to cancel KTC noise in resetting capacitances CL parasitic in the signal lines Sig1 to Sig3. If necessary, the gain can be applied at a ratio "CFB/CC" between the capacitances CFB and CC.

Each amplifier 17 is connected to a sample-and-hold capacitance CSH and the analog multiplexer 11 via a sample-and-hold switch SH. The analog multiplexer 11 comprises a switch, shift register (neither is shown), and the like.

Parallel signals corresponding to the signal lines Sig1 to Sig3 are serially converted by the analog multiplexer 11, and output to an analog data line. The analog data line is connected to an operational amplifier PC. The output side of the operational amplifier PC is connected to a second LPF (Low-Pass Filter) 15 made up of a resistor RD, resistor RE, capacitance CM, and switch SEL2. The second LPF 15 can switch the cut-off frequency by using the switch SEL2. That is, the cut-off frequency of the second LPF 15 can be selected from the following two frequencies fc3 and fc4:

$$fc3 = 1/(2 \cdot \Pi \cdot (RE+RD) \cdot CM)$$

$$fc4 = 1/(2 \cdot \Pi \cdot RE \cdot CM) > fc3$$

An analog data output is input to an A/D converter 13 via the second LPF 15 and A/D-converted by the A/D converter 13, and the converted digital data is output to a digital output bus. The readout apparatus 1 further comprises a timing generator 12 which switches between the ON and OFF states of the switches RC, DRC, SEL1, SEL2, SH, and DRC.

The imaging apparatus according to the first embodiment comprises a control circuit 5 connected to the sensor array 4 and readout apparatus 1. The control circuit 5 has a function of switching the cut-off frequencies of the first and second LPFs 14 and 15 in accordance with the imaging mode of the imaging apparatus.

Figure 2:
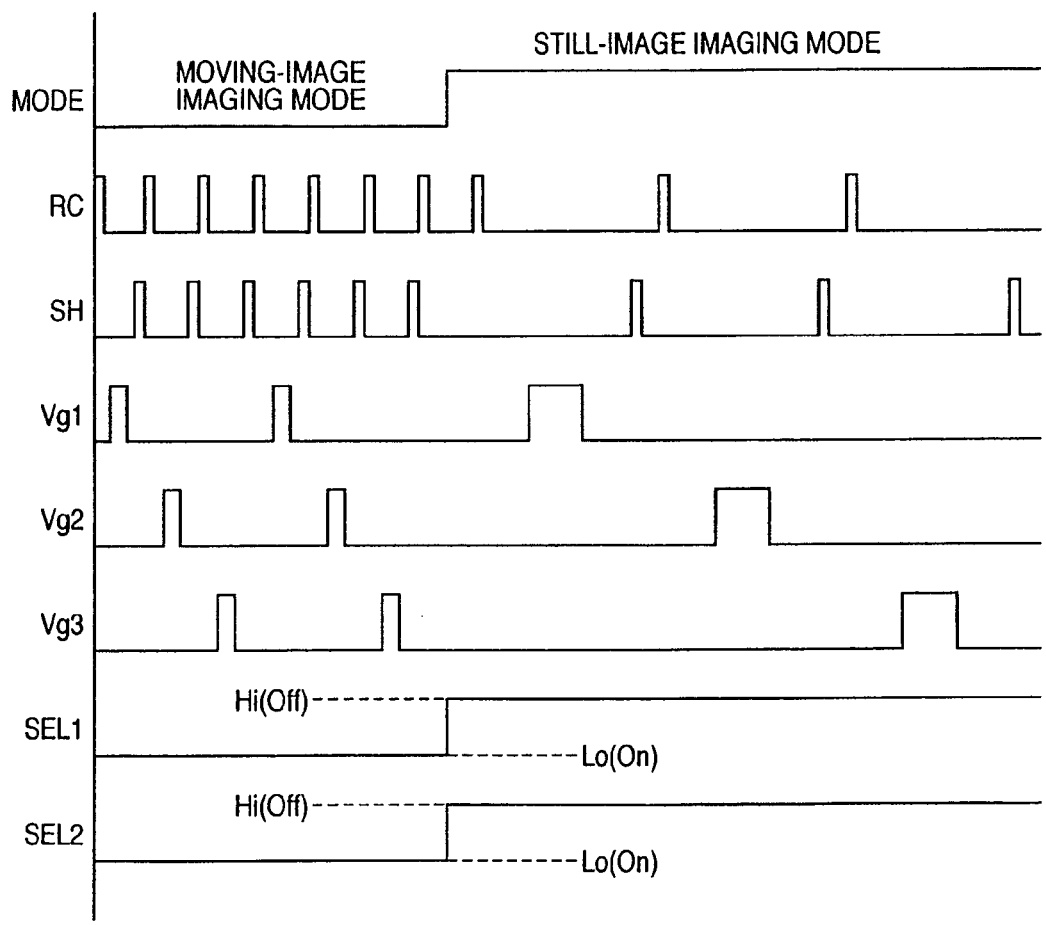
FIG. 2 is a timing chart showing the operation of the imaging apparatus according to the first embodiment of the present invention.

The operation of the imaging apparatus according to the first embodiment will be explained. FIG. 2 is a timing chart showing the operation of the imaging apparatus according to the first embodiment of the present invention.

A MODE signal is input from a mode switching means (not shown) to the control circuit 5. The control circuit 5 changes the sensor array 4 and readout apparatus 1 to the still-image imaging mode when a Hi MODE signal is input and to the moving-image imaging mode when an Lo MODE signal is input. The control circuit 5 controls the timing generator 12, and turns on (control signal: Lo) the switches SEL1 and SEL2 in the moving-image imaging mode. As a result, the cut-off frequencies of the first and second LPFs 14 and 15 are switched to fc2 (>fc1) and fc4 (>fc3), respectively. In the still-image imaging mode, the control circuit 5 turns off (control signal: Hi) the switches SEL1 and SEL2. As a result, the cut-off frequencies of the first and second LPFs 14 and 15 are switched to fc1 (<fc2) and fc3 (<fc4), respectively. That is, the control circuit 5 sets the cut-off frequencies of the first and second LPFs 14 and to be higher in the moving-image imaging mode than in the still-image imaging mode.

The relationship between the control signals of the switches SEL1 and SEL2 and the cut-off frequencies is summarized into the following table:

| Switch | Control Signal | On/Off | Cut-Off Frequency | High/Low | Mode |
|---|---|---|---|---|---|
| SEL1 | Lo | On | fc2 = 1/(2 · Π · RA · CC) | High | Moving-Image Imaging |
|  | Hi | Off | fc1 = 1/(2 · Π · (RA + RB) · CC) | Low | Still-Image Imaging |
| SEL2 | Lo | On | fc4 = 1/(2 · Π · RE · CM) | High | Moving-Image Imaging |
|  | Hi | Off | fc3 = 1/(2 · Π · (RE + RD) · CM) | Low | Still-Image Imaging |

As shown in FIG. 2, the control circuit 5 sequentially turns on the TFTs T11 to T13, TFTs T21 to T23, and TFTs T31 to T33 by controlling the timing generator 12 and sequentially applying pulses to the common gate lines Vg1, Vg2, and Vg3 in both the moving-image imaging mode and still-image imaging mode. The control circuit 5 applies to the readout apparatus 1 a pulse for turning on the switches RC and SH in order to control the timing generator 12 and control the readout timing. Although not shown, the control circuit 5 may cause the timing generator 12 to generate a signal for turning on the switch DRC, as needed, in order to cancel KTC noise.

According to the first embodiment, (1) the first LPFs 14 are arranged which can change the cut-off frequency in correspondence with the signal lines Sig1 to Sig3. (2) The second LPF 15 is arranged which can change the cut-off frequency in correspondence with the analog data line for transmitting an analog signal serially converted by the analog multiplexer 11. (3) The control circuit 5 switches the cut-off frequencies of the first and second LPFs 14 and 15 in accordance with the operation mode of the imaging apparatus. The first embodiment can, therefore, reduce noise of a serially converted analog signal that is generated by thermal noise of the analog multiplexer 11, that of the operational amplifier PC connected to the analog multiplexer 11, and the like. The cut-off frequencies (=time constants) of the LPFs 14 and 15 can also be adjusted in accordance with the frame readout rate which changes between the moving-image imaging mode and the still-image imaging mode. Hence, a preferable noise characteristic can be obtained in the still-image imaging mode while enabling readout at high rate in the moving-image imaging mode.

FIGS. 1 and 2 illustrate a portion corresponding to pixels of three rows and three columns, but a larger number of pixels may be arrayed. Also, a plurality of analog multiplexers 11 and a plurality of analog data lines may be provided. In this case, for example, one operational amplifier PC, one second LPF 15, and one A/D converter 13 are arranged for each analog data line.

Figure 3:
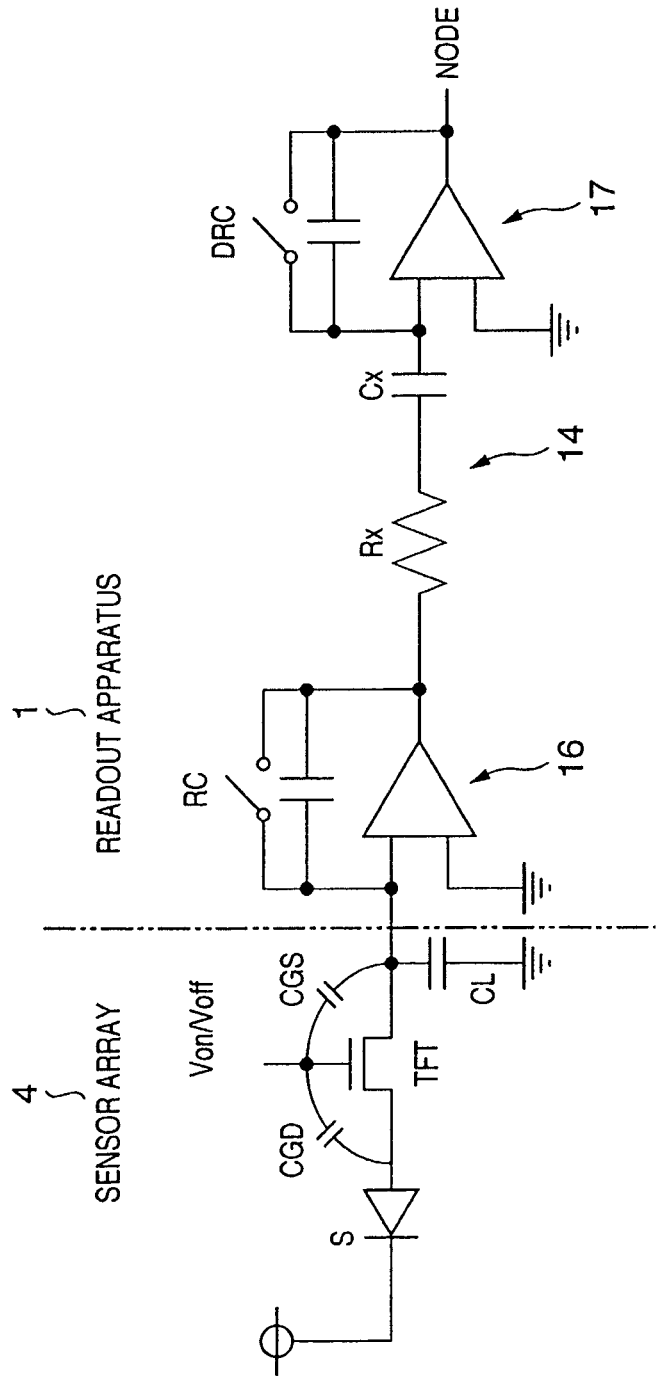
FIG. 3 is an equivalent circuit diagram showing a portion corresponding to one pixel of an area sensor 4 and one channel of a readout apparatus 1.

The relationship between the time constant of each LPF and a time necessary to read out one frame will be explained. FIG. 3 is an equivalent circuit diagram showing a portion corresponding to one pixel of the area sensor 4 and one channel of the readout apparatus 1.

In general, a TFT and signal line are capacitively coupled by a parasitic capacitance CGS of the TFT. When a pulse for driving the gate of the TFT is applied to the gate electrode, the potential of the signal line varies due to capacitive coupling to influence an output from the readout apparatus 1. The influence on an output from the readout apparatus 1 attenuates by a time constant $\tau 1$ determined by Rx and Cx: $\tau 1 = Rx \cdot Cx$, and the degree of influence is proportional to $(Von-Voff) \cdot (1-\exp(-T/\tau 1))$. In this case, Rx is the resistance value of the first LPF 14, Cx is the capacitance value of the first LPF 14, and T is the elapsed time. An output from the readout apparatus 1 varies instantaneously when the TFT is turned on and off, and attenuates at the time constant $\tau 1$ determined by Rx and Cx. If readout is executed before variations in output attenuate, an error such as noise or offset variations may occur.

In the control of a radiographic apparatus, it is empirically known that the influence on an image can be reduced by setting a time of about $3 \times \tau 1$ at each of the ON and OFF instants of the TFT. A time Trow corresponding to one common gate line is given by $$Trow \geq 3 \cdot \tau 1 + 3 \cdot \tau 1 = 6\tau 1 \quad (1)$$

Letting n be the number of common gate lines, a time Trow (time Trow assigned to one common gate line) derived from a speed, i.e., a frame rate FPS required for an application is given by inequality (2). In this case, the definition of the frame rate is as follows: the reciprocal of a time necessary to read out image signals from all the rows of the sensor array is defined as the frame rate.

$$Trow \leq (1/FPS)/n \quad (2)$$

Inequalities (1) and (2) lead to inequality (3) as a relation for obtaining a high-quality image by the imaging apparatus:

$$6 \cdot \tau 1 \leq (1/FPS)/n \quad (3)$$

As for the resistor RA, resistor RB, and capacitance CC which constitute the first LPF 14, the resistance values and capacitance value are desirably so selected as to satisfy the relation of inequality (3) in each of the moving-image imaging mode and still-image imaging mode.

Figure 7:
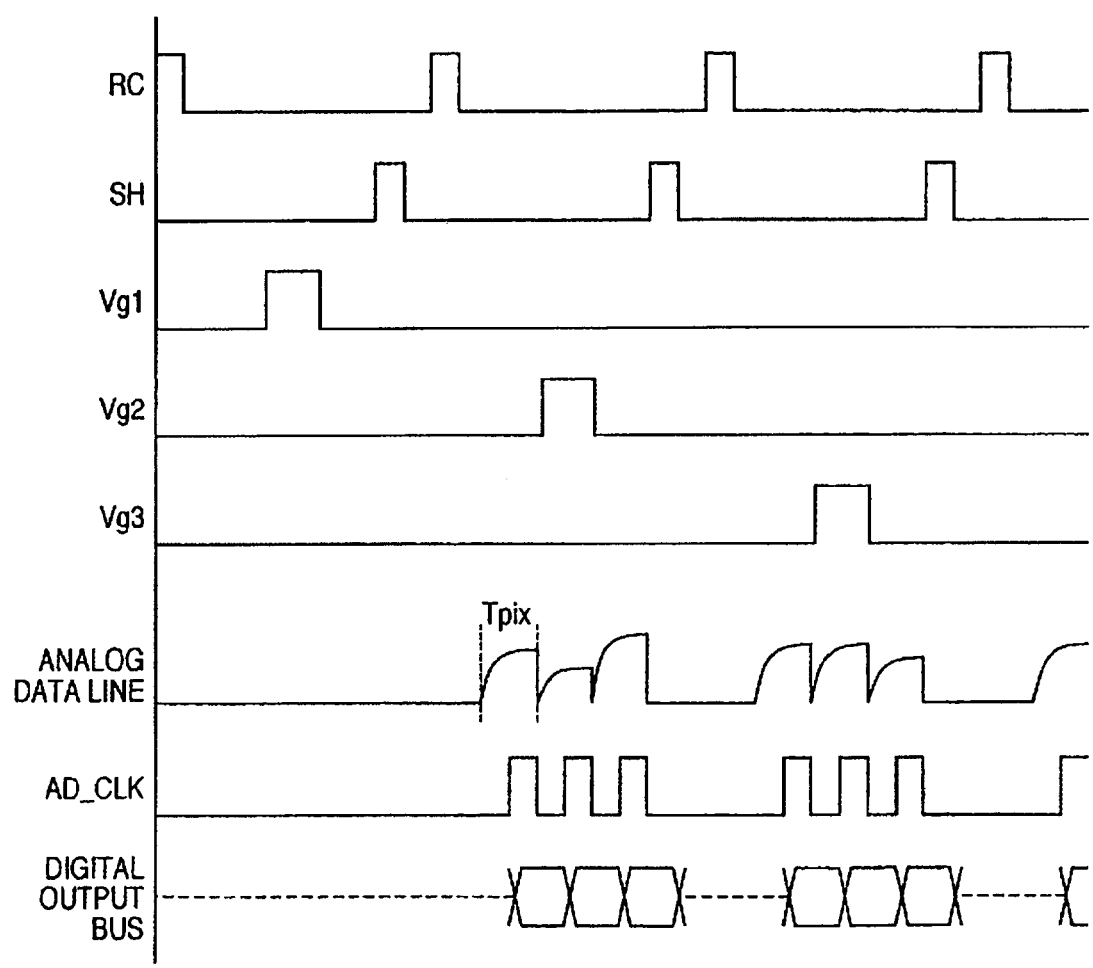
FIG. 7 is a timing chart showing the operation of the conventional imaging apparatus.
Figure 8:
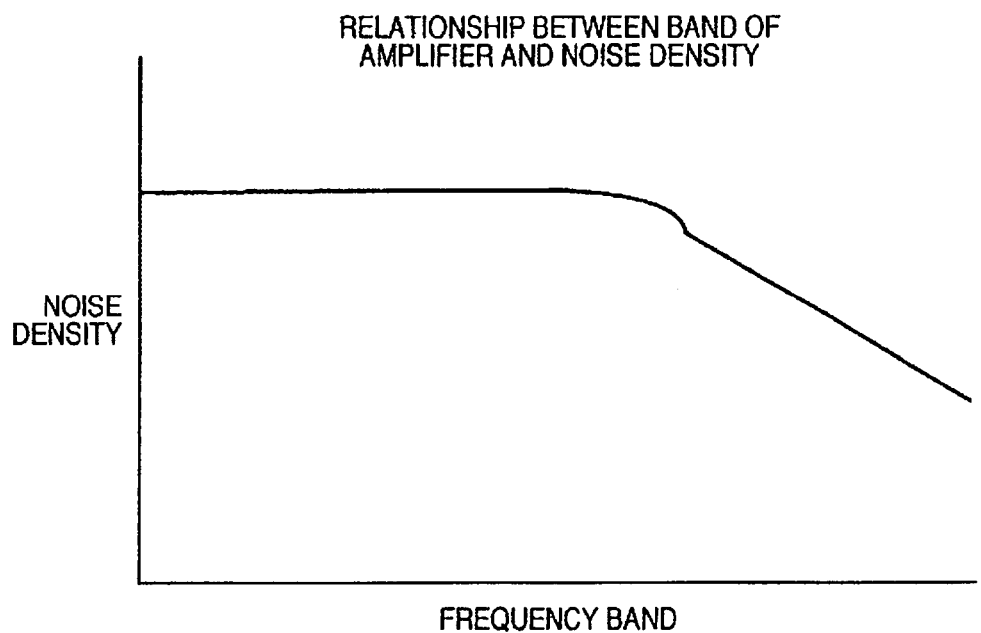
FIG. 8 is a graph showing the relationship between the band of an amplifier and the noise density.

As for the second LPF 15 arranged on the analog data line, the response of the analog data line is determined by a time constant $\tau 2$ of the second LPF 15 when an output from the analog multiplexer is ideal. In the radiographic apparatus, it is empirically effective that a time Tpix (see FIG. 7) assigned to each pixel satisfies inequality (4) for the response of the analog data line:

$$Tpix \geq 3 \cdot \tau 2 \quad (4)$$

Letting FPS be the frame rate necessary for an application, A be the number of A/D converters 13 corresponding to the respective data lines, m be the number of signal lines of the sensor array, and n be the number of common gate lines of the sensor array, the time Tpix assigned to each pixel is given by inequality (5):

$$Tpix \leq (1/FPS) \cdot A/(m \cdot n) \quad (5)$$

From inequalities (4) and (5), the resistance values of the resistors RD and RE and the capacitance value of the capacitance CM are desirably so selected as to satisfy inequality (6):

$$3 \cdot \tau 2 \leq (1/FPS) \cdot A/(m \cdot n) \quad (6)$$

In this manner, the cut-off frequencies (=time constants) of the LPFs 14 and 15 are adjusted in accordance with the frame readout rate which changes between the moving-image imaging mode and the still-image imaging mode. While readout can be achieved at high rate in the moving-image imaging mode, a preferable noise characteristic can be obtained in the still-image imaging mode.

The first embodiment adopts a pixel having a photodiode and TFT with an amorphous silicon film. However, the pixel structure is not limited to this, and another structure may be employed. For example, the photodiode may be replaced with an element which directly converts X-rays into charges, like amorphous selenium, lead iodide, mercurous iodide, gallium arsenide, gallium phosphide, CdZn, or CdZnTe.

Second Embodiment

Figure 4:
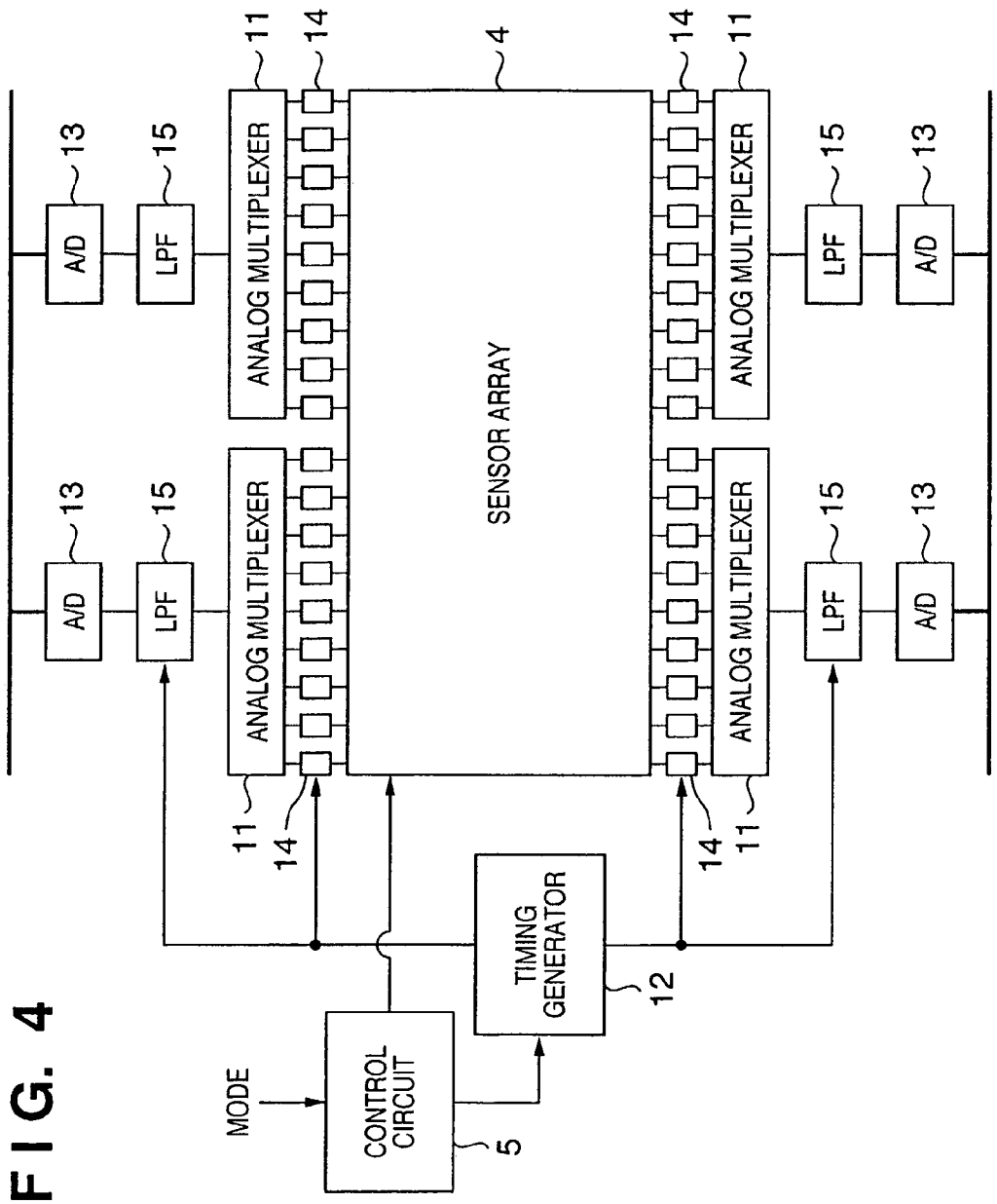
FIG. 4 is a block diagram showing the configuration of an imaging apparatus according to the second embodiment of the present invention.
Figure 5:
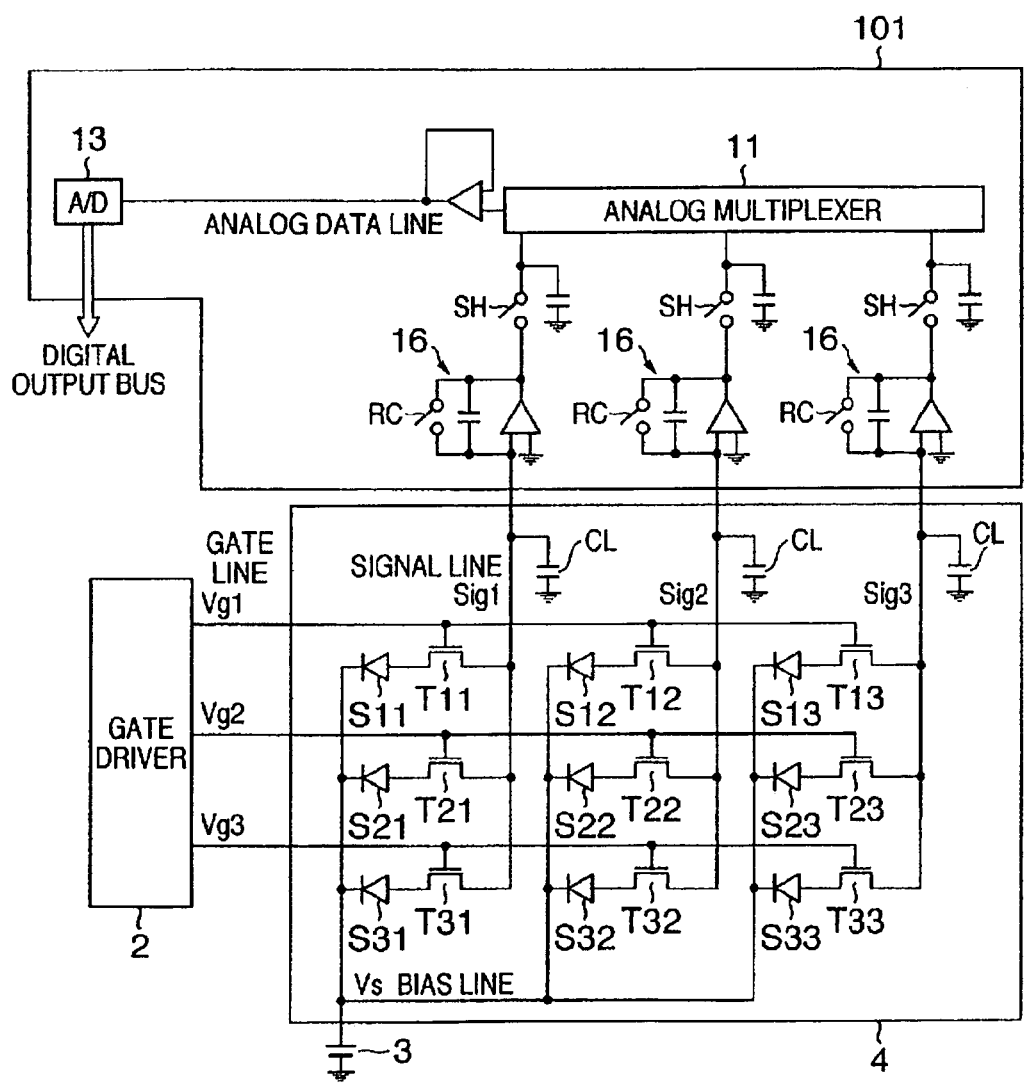
FIG. 5 is a schematic circuit diagram showing the circuit configuration of a conventional imaging apparatus.
Figure 6:
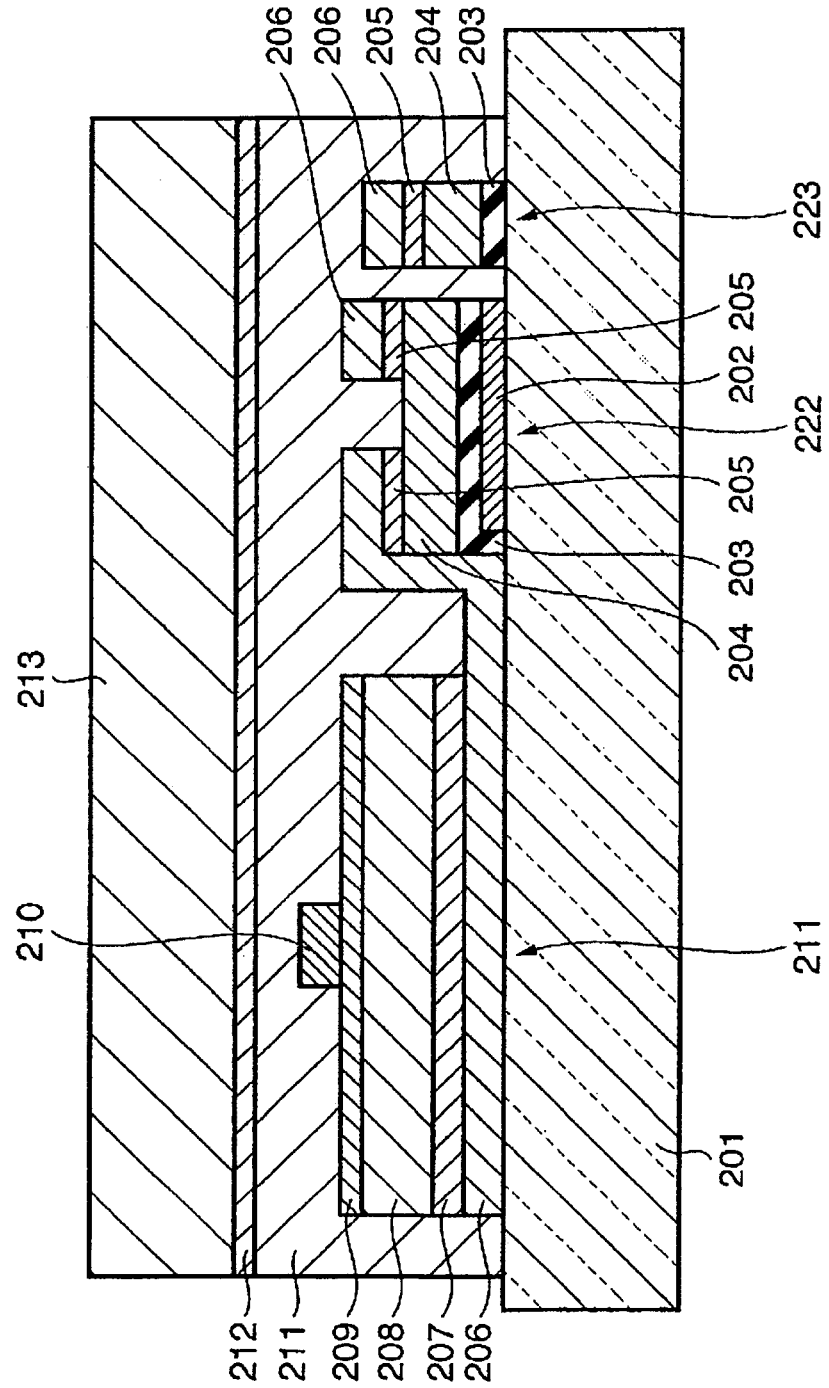
FIG. 6 is a sectional view showing the pixel of a sensor array.

The second embodiment of the present invention will be described. FIG. 4 is a block diagram showing the configuration of an imaging apparatus according to the second embodiment of the present invention. In the first embodiment, readout from a signal line arranged in the sensor array is possible from only one end of the signal line. To the contrary, in the second embodiment, readout is possible from the two ends of the signal line. Readout apparatuses are arranged in correspondence with the two ends of each signal line. Note that FIG. 4 shows only LPFs 14 and 15, analog multiplexers 11, A/D converters 13, and a timing generator 12 as components of the readout apparatuses, and does not show a charge-to-voltage conversion amplifier (preamplifier) 16 and the like.

The second embodiment achieves higher-rate readout. When the second embodiment is applied to inequalities (3) and (6) described above, the number of A/D converters is four. Also in the second embodiment, the relations of inequalities (3) and (6) are preferably established.

Third Embodiment

Figure 9:
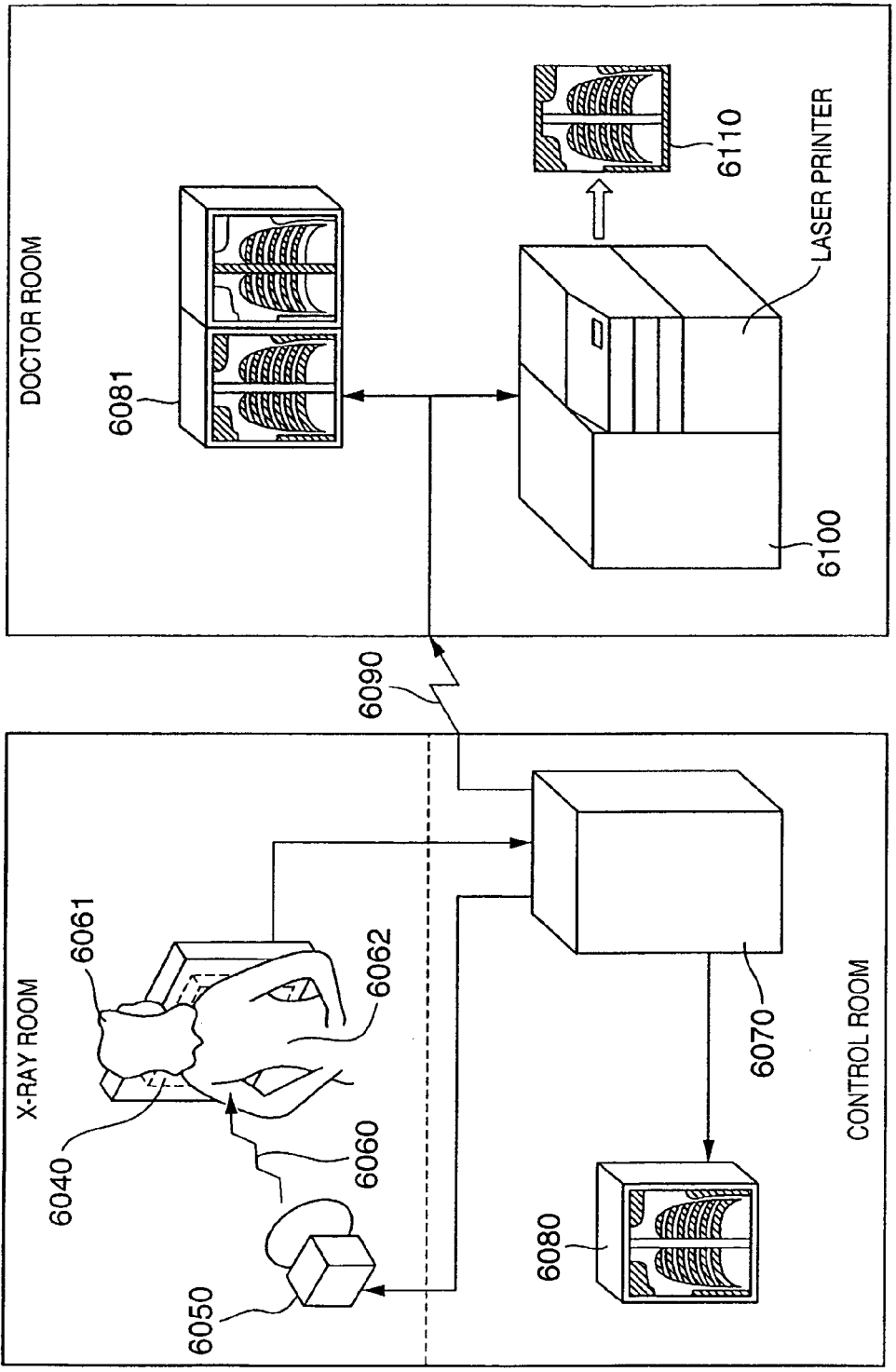
FIG. 9 is a schematic view showing an application example (third embodiment) of the imaging apparatus according to the embodiments of the present invention to a radiographic system.

The third embodiment of the present invention will be described. FIG. 9 is a schematic view showing an application example (third embodiment) of the imaging apparatus according to the embodiments of the present invention to a radiographic system.

X-rays 6060 generated by an X-ray tube 6050 pass through a chest 6062 of a patient or subject 6061, and is incident on an image sensor 6040 which incorporates the imaging apparatus according to the embodiments of the present invention. Incident X-rays contain internal information of the body of the patient 6061. A scintillator (phosphor) emits light in correspondence with incidence of X-rays, and light is photoelectrically converted by the photoelectric conversion device of a sensor panel to obtain electrical information. The image sensor 6040 outputs the information as an electrical signal (digital signal) to an image processor 6070. The image processor 6070 serving as an image processing means performs an image process for the received signal, and outputs the processed signal to a display 6080 serving as the display means of a control room. The user can observe the image displayed on the display 6080 to obtain the internal information of the body of the patient 6061. The image processor 6070 also has the function of a control unit, can switch between the moving- and still-image imaging modes, and can control the X-ray tube (X-ray generator) 6050.

Also, the image processor 6070 can transfer an electrical signal output from the image sensor 6040 to a remote place via a transmission processing means such as a telephone line 6090, and display the signal on a display means (display) 6081 at another place such as a doctor room. Further, the image processor 6070 can save an electrical signal output from the image sensor 6040 in a recording means such as an optical disk to allow a doctor at a remote place to perform diagnosis by using the recording means. The electrical signal can also be recorded on a film 6110 by a film processor 6100 serving as a recording means.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-071324 filed on Mar. 12, 2004, which is hereby incorporated by reference herein.

What is claimed is:

1. A readout apparatus which reads out signals via a plurality of signal lines from an area sensor having pixels arranged to form rows and columns, each pixel having a photoelectric conversion device, comprising:
    a plurality of amplifiers which are arranged in correspondence with the respective signal lines each arranged in correspondence with respective one of the columns;
    a plurality of low-pass filters which are arranged in correspondence with respective ones of said plurality of amplifiers; and
    a conversion unit for serially converting signals that have passed through said low-pass filters and outputting the converted signals,
    wherein the cut-off frequency of said low-pass filters can be switched in accordance with a time necessary to read out signals from the area sensor to output signals for one row, and
    wherein, letting $\tau$ be a time constant of said low-pass filter, and Trow be the time necessary to read out signals from the area sensor to output signals for one row, a relation $6\tau \le \text{Trow}$ is satisfied.

2. The apparatus according to claim 1, wherein cut-off frequencies of said low-pass filters can be switched on at least two stages.

3. The apparatus according to claim 1, wherein each of said plurality of amplifiers comprises a charge-to-voltage conversion amplifier that includes an operational amplifier, a feedback capacitor, and a reset switch.

4. The apparatus according to claim 1, wherein, letting Tf be the time necessary to read out one frame from said area sensor, and n be the number of the rows, a relation $6\tau \le \text{Tf}/n$ is satisfied.

5. An imaging apparatus comprising:
    an area sensor having pixels arranged to form rows and columns, each pixel having a photoelectric conversion device;
    a readout apparatus which reads out output signals from said area sensor via a plurality of signal lines each arranged in correspondence with a respective one of said columns of said area sensor; and
    a control unit for controlling operations of said area sensor and said readout apparatus,
    wherein said readout apparatus comprises a plurality of amplifiers which are arranged in correspondence with respective ones of the signal lines, a plurality of low-pass filters which are arranged in correspondence with respective ones of said plurality of amplifiers, and a conversion unit for serially converting signals that have passed through said low-pass filters and outputting the converted signals,
    wherein cut-off frequencies of said low-pass filters can be switched on at least two stages,
    wherein said control unit has a function of switching the cut-off frequency of said low-pass filters in accordance with a time necessary to read out signals from the area sensor to output signals for one row, and
    wherein, letting $\tau$ be a time constant of said low-pass filter, and Trow be the time necessary to read out signals from the area sensor to output signals for one row, a relation $6\tau \le \text{Trow}$ is satisfied.

6. The apparatus according to claim 5, wherein
a moving-image imaging mode and a still-image imaging mode are selectable as imaging modes, and
said control unit has a function of switching the cut-off frequency of low-pass filters in accordance with the time necessary to read out one frame from said area sensor which changes between the moving-image imaging mode and the still-image imaging mode.

7. The apparatus according to claim 6, wherein said control unit sets the cut-off frequencies of said low-pass filters to be higher in the moving-image imaging mode than in the still-image imaging mode.

8. The apparatus according to claim 5, wherein said pixels have thin-film transistors connected to said photoelectric conversion devices, and are arrayed within said area sensor, and the area sensor further comprises a plurality of common gate lines each arranged in correspondance with a respective one of the rows of the area sensor.

9. The apparatus according to claim 5, wherein said area sensor includes an X-ray sensor which detects X-rays.

10. The apparatus according to claim 9, wherein said area sensor has a wavelength converter which converts a wavelength of incident X-rays.

11. The apparatus according to claim 9, wherein said photoelectric conversion device includes a device which directly converts incident X-rays into charges.

12. A radiographic system comprising:
the imaging apparatus according to claim 5; and
an X-ray generator which emits X-rays toward the imaging apparatus.

13. The apparatus according to claim 5, wherein each of said plurality of amplifiers comprises a charge-to-voltage conversion amplifier that includes an operational amplifier, a feedback capacitor, and a reset switch.

14. The apparatus according to claim 5, wherein letting Tf be the time necessary to read out one frame from said area sensor, and n be the number of the rows, a relation $6\tau \le Tf/n$ is satisfied.

* * * * *